United States Patent [19]

Scherer

[11] 4,248,614
[45] Feb. 3, 1981

[54] METHOD FOR DRAWING HIGH-BANDWIDTH OPTICAL WAVEGUIDES

[75] Inventor: George W. Scherer, Painted Post, N.Y.

[73] Assignee: Corning Glass Works, Corning, N.Y.

[21] Appl. No.: 115,566

[22] Filed: Jan. 28, 1980

Related U.S. Application Data

[63] Continuation of Ser. No. 21,439, Mar. 19, 1979, abandoned.

[51] Int. Cl.³ .............................................. C03C 25/02
[52] U.S. Cl. ...................... 65/3 A; 65/30 E; 350/96.33
[58] Field of Search ................ 65/3 A, 30 E; 350/96.33

[56] References Cited

U.S. PATENT DOCUMENTS 4,102,664  7/1978  Dumbaugh .................. 65/30 E X

FOREIGN PATENT DOCUMENTS 2804467  8/1978  Fed. Rep. of Germany ........... 65/3 A
5156642  5/1976  Japan ........................................ 65/3 A
1473779  5/1977  United Kingdom .................... 65/3 A

*Primary Examiner*—Robert L. Lindsay, Jr.
*Attorney, Agent, or Firm*—Kees van der Sterre; Clinton S. Janes, Jr.

[57] ABSTRACT

In a method for directly drawing a glass optical waveguide or waveguide blank from two or more reservoirs of molten glass wherein a relatively high refractive index glass core member is clad with a relatively low refractive index glass cladding, control over the refractive index variations occurring due to the migration of dopants between the core and cladding is obtained by providing one or more glass diffusion layers between the core and cladding.

3 Claims, 5 Drawing Figures

METHOD FOR DRAWING HIGH-BANDWIDTH OPTICAL WAVEGUIDES

This is a continuation of application Ser. No. 021,439, filed Mar. 19, 1979, now abandoned.

BACKGROUND OF THE INVENTION

The present invention is in the field of optical waveguides, and particularly relates to the production of optical waveguides or optical waveguide blanks or preforms directly from molten glass.

Although present commercial high-bandwidth optical waveguide filaments are produced by processes involving the chemical vapor deposition of glass waveguide components to form pure waveguide blanks or preforms, it has also been proposed to produce such products by direct drawing from molten glass. Hence, U.S. Pat. No. 3,726,656 describes an updrawing process for producing glass-clad glass rod which can be used as a blank or preform for redrawing optical waveguide filaments, while U.S. Pat. Nos. 3,941,474, 3,791,806 and 4,032,313 describe the manufacture of glass-clad glass waveguide filaments by direct down-drawing from nested multiple crucibles or reservoirs of molten glass.

The direct drawing of optical waveguides from molten glass produced by a chemical vapor deposition process is described in U.S. Pat. No. 4,065,280, while published German Application No. 2,614,631 describes the production of multilayer optical waveguides by an up-draw process.

Molten glass drawing methods have been proposed for the manufacture of both step-index and graded-index optical waveguides. In the case of step-index waveguides, only two crucibles or other reservoirs of molten glass are needed. These are concentrically positioned so that a relatively low refractive index glass for the waveguide cladding layer is drawn from an outer reservoir and formed around a relatively high refractive index glass for the waveguide core which is simultaneously drawn from an inner reservoir. In the case of a graded-index waveguide, multiple crucibles or reservoirs of molten glass are used, with the glass in the outer reservoir forming the optical waveguide cladding layer and the glasses in the inner reservoirs forming a core group which ultimately becomes the core member of the optical waveguide. Glasses which increase stepwise in refractive index from the periphery of the core group to the center thereof are used to approximate the parabolic core index profile which is desirable for high waveguide bandwidth.

The refractive indices of the glasses forming the core and cladding layers in the multiple crucible assembly are controlled through the use of additives, termed dopants, which typically act to raise the refractive index of a glass in which they are dissolved to an extent proportional to their concentration therein (although dopants which reduce refractive index are also known). At the elevated temperatures employed for the direct drawing of waveguides or waveguide blanks from molten glass, these refractive-index-controlling dopants tend to diffuse or migrate from one glass layer to another. This has not been considered to be objectionable since the effect is to smooth the refractive index profile in the core group and thus to better approximate the parabolic index distribution necessary for high bandwidth.

However, one disadvantageous effect of dopant migration during the manufacture of optical waveguide filaments or blanks or molten glass is the migration which occurs between the outermost core members and the cladding layer. This core/cladding diffusion of dopants results in diffusion "tails", which are localized increases in the refractive index of the cladding near the core/cladding boundary. These tails reduce the definition of the boundary and undesirably decrease the bandwidth of the optical waveguide.

It is a principal object of the present invention to provide a method for the direct drawing of optical wave-guides wherein the problem of core/cladding diffusion is avoided.

Other objects and advantages of the invention will become apparent from the following description thereof.

SUMMARY OF THE INVENTION

In accordance with the present invention, the effects of core/cladding diffusion during waveguide or waveguide blank manufacture are neutralized by providing at least one glass diffusion layer between the core and the cladding as the waveguide or waveguide blank is drawn from the melt. The diffusion layer is formed from molten glass which has a refractive index below that of the cladding glass, typically because it contains a lower quantity of dopants for raising its refractive index than either the cladding glass or the glasses of the core group.

As dopants diffuse among the diffusion layer and the core and cladding glasses during the drawing process, the refractive index of the diffusion layer glass will increase. However, by adjusting the initial refractive index and thickness of the diffusion layer, the amount of increase can be controlled so that the refractive index of the diffusion layer in the waveguide as drawn is essentially equivalent to that of the cladding. In this way, diffusion "tails" such as are found in conventionally produced optical waveguides are suppressed and improved core/cladding bounday definition is obtained, resulting in higher waveguide bandwith.

Further improvements in core/cladding boundary definition can be obtained using two diffusion layers between the core and cladding. Again, the first diffusion layer is positioned adjacent to the core member, and has a refractive index below that of the core and cladding glasses, functioning to compensate for the increases in cladding refractive index normally resulting from proximity to the high-index core glasses. A second diffusion layer, positioned adjacent to the first diffusion layer and between the first layer and the cladding, has a refractive index higher than that of the cladding. This layer compensates for a tailing down of the index of the cladding which might otherwise result from dopant migration into the first diffusion layer.

BRIEF DESCRIPTION OF THE DRAWINGS

The invention may be further understood by reference to the drawings, wherein.

DETAILED DESCRIPTION

Figure 1:
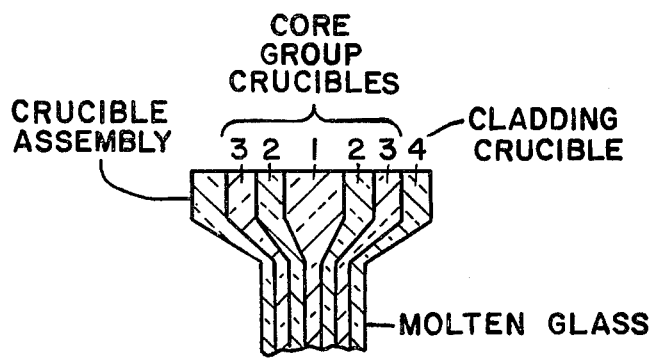
FIG. 1 is a schematic illustration in cross-section of a concentric orifice, multiple crucible assembly of the kind conventionally used for drawing graded-index optical waveguides.

Referring again to the drawings, a crucible assembly such as shown in FIG. 1 is conventionally used to draw optical waveguide filaments directly from a melt. The outermost crucible will typically contain a glass 4 of relatively low refractive index for the waveguide cladding, while the inner group of crucibles will contain the relatively high refractive index glasses 1-3 of the core group. Each of the crucibles in the core group will contain a glass of different composition, with the refractive indices of the compositions increasing from the outermost crucible of the core group to the central crucible. Thus the molten glass leaving the orifice assembly will have a refractive index profile ranging from a maximum at the center orifice to a minimum at the outer or cladding orifice.

Figure 2:
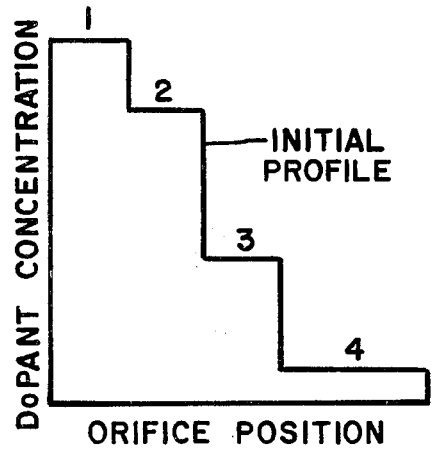
FIG. 2 is a graph showing the initial composition profile of a group of glasses as drawn from a multiple crucible assembly of the kind shown in FIG. 1.

Normally, the dopant used in these glasses to control refractive index will be one which is effective to raise the refractive index of the glass, so that the core glasses of the inner crucibles will be relatively high in dopant concentration with respect to the cladding glass. A half-profile of dopant concentration versus orifice position for such a case, ranging from the center crucible to the cladding crucible, is shown in FIG. 2 of the drawing.

As the glasses are drawn from the crucible assembly, an interdiffusion of dopants among the various layers of glass results in a smoothing of the composition and refractive index profiles in the drawn waveguide. This smoothing effect is illustrated by the broken line in FIG. 3 of the drawing, which represents a final index profile of a drawn waveguide resulting from the initial profile shown in FIG. 2.

Figure 3:
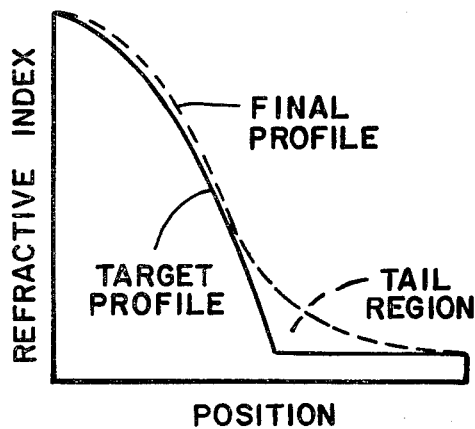
FIG. 3 is a graph showing the final composition profile of an optical waveguide produced from a group of glasses such as shown in FIG. 2.

The solid line in FIG. 3 represents a target profile for an ideal graded-index optical waveguide. The inter-diffusion of dopants among the glasses in the core group results in good matching between the profiles of the waveguide and the target. However, a tailing up of the cladding dopant composition and refractive index occurs near the core/cladding boundary, resulting in the deviation from the optimum boundary profile shown by the hatched "tail" region in FIG. 3.

In accordance with the invention, the extent of this deviation is reduced through the use of a glass diffusion layer between the core group and cladding glass, this diffusion layer typically having a dopant concentration below that of the glasses of the core group and cladding. An initial dopant concentration and refractive index profile for a group having a diffusion layer is illustrated by the solid line in the graph constituting FIG. 4 of the drawing. The diffusion layer is obtained by filling the crucible immediately adjacent to the cladding glass crucible with a glass having a very low dopant concentration.

Figure 4:
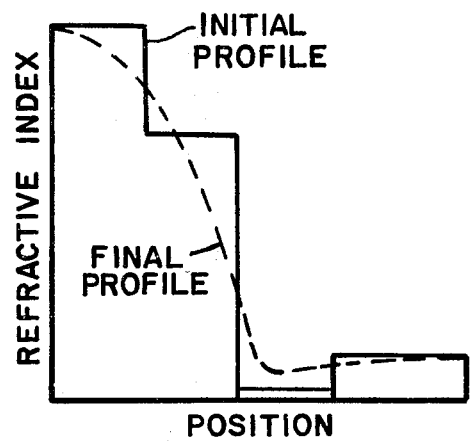
FIGS. 4 and 5 are graphs showing the initial and final composition profiles of groups of glasses comprising diffusion layers, which are useful for providing high bandwidth optical waveguides according to the invention.

The broken line in FIG. 4 of the drawing illustrates a final dopant concentration and refractive index profile for an optical waveguide formed from the group of glasses shown in FIG. 4, after interdiffusion of the dopants therein during drawing. That profile indicates that a considerable reduction in the size of diffusion "tails" resulting from core/cladding dopant diffusion can be realized through the use of a low-dopant diffusion layer.

Although the final index profile shown in FIG. 4 represents an improvement in core/cladding boundary definition over the profile shown in FIG. 3, some tailing down of the dopant concentration and refractive index in the cladding glass near the core/cladding interface is observed. To control this effect, a second diffusion layer is preferably introduced into the waveguide structure between the first diffusion layer and the cladding.

Figure 5:
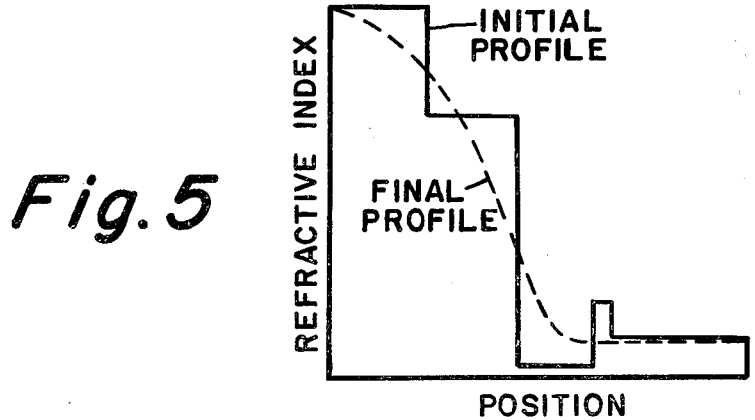

The solid line in FIG. 5 of the drawing corresponds to an initial profile of dopant concentration and refractive index as a function of crucible position for a group of glasses which includes two diffusion layers between the core and cladding. The relatively high refractive index of the outer diffusion layer immediately adjacent to the cladding is intended to reduce the tailing down of the index of the cladding during waveguide drawing.

The broken line in FIG. 5 corresponds to a final dopant and index profile for an optical waveguide drawn from the group of glasses having the initial profile shown in that figure. The final profile suggests that the second diffusion layer can control the out-diffusion of dopants from the waveguide cladding, and that a profile exhibiting excellent correspondence with an ideal graded-index profile can be obtained in glass systems utilizing two diffusion layers.

Although the foregoing detailed description has been presented in terms of the diffusion of a single refractive-index-increasing dopant, it will be recognized that dopant migration in glasses frequently involves an ion exchange process wherein cationic species migrating out of a glass layer are exchanged for other cationic species migrating into the glass layer. Thus the term dopant is intended to encompass migrating cationic species which are more effective in raising the refractive index of a glass than the species by which they are replaced.

Glass-modifying oxides incorporating cations which are effective in raising the refractive index of glasses are well known, such oxides including most of the alkali and alkaline metal earth oxides as well as a variety of other oxides of monovalent, divalent or even trivalent metal ions. Generally, the monovalent cations are preferred from the standpoint of diffusion efficiency.

Multiple crucible assemblies which can be used in the production of graded-index optical waveguides according to the invention include any of the assemblies utilized in the prior art for this purpose. Such assemblies may be fabricated from refractory ceramic materials or, preferably, platinum, with the configuration and spacing of the multiple orifices depending upon the viscosity and target thickness of each of the glass layers to be included in the waveguide or waveguide blank.

The refractive index and thickness of the core group layers and diffusion layers are selected based upon the refractive index profile desired in the drawn waveguide. Factors which will affect the target thickness and refractive index are the diffusion rates of the cationic dopants in each of the layers and the thermal conditions under which the drawing, or drawing and redrawing, of the waveguide are to be carried out. However, these factors may readily be determined for any particular doping system and target profile by routine experiment.

As an example of a particular configuration which may be used to provide an optical waveguide having a dopant and refractive index profile such as shown in FIG. 5, the following Table sets forth a five-layer configuration comprising two core layers, two diffusion layers, and a cladding layer. Included in the Table are a normalized dopant concentration for each of the layers, and a thickness for each of the layers, expressed as a radial thickness range wherein the axis of the glass stream is at radius (R)=0 and the outer surface of the glass stream is at (R)=1.0. The refractive indices of the core, diffusion and cladding layers are proportional to the concentration of dopant therein.

TABLE

| Layer Identification | Radial Thickness Range | Normalized Dopant Concentration |
| --- | --- | --- |
| Inner core | 0–0.22 | 1.0 |
| Outer core | 0.22–0.425 | 0.7 |
| First Diffusion Layer | 0.425–0.58 | 0.0 |
| Second Diffusion Layer | 0.58–0.63 | 0.2 |
| Cladding | 0.63–1.0 | 0.1 |

Of course the foregoing example is merely illustrative of profiles incorporating diffusion layers which may be provided according to the invention. Obviously, other profiles may be selected, based upon the considerations hereinabove disclosed, to provide high bandwidth drawn optical waveguides for a particular end use.

I claim:

1. In a method of making a glass optical waveguide or waveguide blank wherein a cladding layer composed of a relatively low refractive index glass is formed around a core member composed of one or more relatively high refractive index glasses by simultaneously drawing the core and cladding glasses from separate reservoirs of molten glass, one or more of the glasses containing a refractive-index-controlling monovalent or divalent metal cation dopant which is capable of migrating between the core member and cladding layer at elevated temperatures, the improvement wherein a glass diffusion layer is provided between the cladding layer and the core member, the glass diffusion layer being initially formed of a molten glass having a lower refractive index than the glass forming the cladding layer but increasing to a refractive index value at least equivalent to that of the cladding layer in the waveguide as drawn.

2. In a method of making a glass optical waveguide or waveguide blank wherein a cladding layer composed of a relatively low refractive index glass is formed around a core member composed of one or more relatively high index glasses by simultaneously drawing the core and cladding glasses from separate reservoirs of molten glass, one or more of the glasses containing a refractive-index-controlling monovalent or divalent metal cation dopant which is capable of migrating between the core member and cladding layer at elevated temperatures, the improvement wherein two glass diffusion layers are provided between the cladding layer and the core member, said diffusion layers including a first diffusion layer positioned adjacent to the core member and having a lower refractive index than the cladding layer, and a second diffusion layer positioned adjacent to the first diffusion layer having a greater refractive index than the cladding layer, the refractive index of said first diffusion layer increasing to a value at least equivalent to that of the cladding layer in the waveguide as drawn.

3. A method in accordance with claims 1 or 2 wherein the core member is composed of one or more relatively high refractive index glasses which contain a refractive-index-increasing dopant capable of migrating into the cladding layer.

* * * * *